United States Patent [19]

Akesaka

[11] Patent Number: 5,050,727
[45] Date of Patent: * Sep. 24, 1991

[54] CONVEYING METHOD AND CONVEYOR APPARATUS

[75] Inventor: Toshio Akesaka, Kanagawa, Japan

[73] Assignee: Kabushikikaisha Isekikaihatsu Koki, Japan

[*] Notice: The portion of the term of this patent subsequent to Jun. 26, 2007 has been disclaimed.

[21] Appl. No.: 419,036

[22] Filed: Oct. 10, 1989

[51] Int. Cl.⁵ ............................................ B65G 15/14
[52] U.S. Cl. ................................ 198/626.1; 198/808; 198/840; 198/842
[58] Field of Search ............... 198/626, 627, 806, 808, 198/840, 842, 626.1

[56] References Cited

U.S. PATENT DOCUMENTS

| | | | |
|---|---|---|---|
| 3,240,321 | 3/1966 | LoPresti et al. | 198/808 |
| 3,593,841 | 7/1971 | Leow | 198/808 X |
| 3,982,626 | 9/1976 | Mehta | 198/626 |
| 4,195,724 | 4/1980 | Janitsch | 198/626 |
| 4,585,118 | 4/1986 | Plant | 198/626 X |

FOREIGN PATENT DOCUMENTS

| | | | |
|---|---|---|---|
| 0045540 | 2/1982 | European Pat. Off. | 198/808 |
| 1166503 | 11/1958 | France | 198/808 |
| 53-71476 | 6/1978 | Japan . | |
| 54-25078 | 2/1979 | Japan . | |
| 0941051 | 11/1963 | United Kingdom | 198/808 |
| 969429 | 9/1964 | United Kingdom . | |

Primary Examiner—D. Glenn Dayoan
Attorney, Agent, or Firm—Eckert Seamans Cherin & Mellott

[57] ABSTRACT

The present invention relates to a conveying method and a conveyor apparatus for the inclined conveyance including the vertical conveyance of materials by superposed two belts and pinching and holding the material to be conveyed between the belts. The present conveying method is characterized by the fact that two belts which are oppositely arranged are superposed. Tensile forces in the direction of the width of the belts is applied to the said superposed belts. Pinching and holding forces for pinching and holding the material to be conveyed between the belts is generated in the superposed belts by the tensile forces, and the material to be conveyed is conveyed by moving the superposed belts in the longitudinal direction.

14 Claims, 4 Drawing Sheets

CONVEYING METHOD AND CONVEYOR APPARATUS

BACKGROUND OF THE INVENTION

1. Field of the Invention

The present invention relates to a conveying method and a conveyor apparatus for performing inclined conveyance of articles including vertical conveyance by superposing two belts and pinching and holding the matter to be conveyed between the belts.

2. Description of the Prior Art

Various conveyor apparatuses which are capable of conveying by superposing two belts which are arranged oppositely and which pinch and hold matter to be conveyed between the belts have been developed. Among others, one technique is shown in the specification of Great Britain Patent No. 969429. This patent describes a conveyor apparatus which is capable of performing inclined conveyance including the vertical conveyance of articles composed of a pulverulent body, a granular body, a massive body or fluid and the like.

In another prior art conveyor apparatus, a larger tensile force is given to the longitudinal direction of the belts. A supporting belt and a cover belt are arranged oppositely, and the matter to be conveyed is conveyed by pinching and holding between the said belts by action of the said tensile force.

Also, the said conveyor apparatus is constructed so that a smooth conveying state can be maintained by arranging a curved conveying portion respectively on a shifting portion from a horizontal conveying position to an inclined conveying position including a vertical conveyance and on a shifting portion from the inclined conveying position to a horizontal conveying portion. The matter to be conveyed is conveyed by pinching and holding with a supporting belt and a cover belt in the course of the curved conveying portion from the said curved conveying portion through the inclined conveying portion. Further, the said inclined conveying portion is usually constituted as a linear conveying portion.

In order that the matters to be conveyed which are pinched and held by the belts of two sheets may not drop and leak out from an end of the belt, as shown in the Official Gazette of Japanese Patent Disclosure No. 25078/1979, the conveyor apparatus includes plural guide roller groups arranged in staggered order along the ends of the superposed belts in the inclined conveying portion.

As shown in the Official Gazette of Japanese Patent Disclosure No. 71476/1978, the conveyor apparatus includes plural tightened rollers which are activated in the direction of the belts by springs arranged on both sides of the superposed belts in the inclined conveying portion. This prevents dropping the matter to be conveyed and the matter to be conveyed is raised by the tightened rollers.

In each of the said conveyors, a pinching and holding force against the matter to be conveyed is generated by providing a larger tensile force in comparison with a usual belt conveyor in the longitudinal direction of the superposed belts in order to prevent dropping or leakage of the matter to be conveyed in the inclined conveying portion. The ends of the superposed belts are pressed and attached by staggered guide roller groups so that dropping of the matter to be conveyed may be prevented by pressing the matter to be conveyed by means of tightening rollers from both sides of the superposed belts.

When a large force is applied in the longitudinal direction of the superposed belts and the matter to be conveyed is pinched and held by action of the force, the larger tensile force is given to the whole of the belt, and the said tensile force acts upon the horizontal conveying portion of the belt and the sides of the return wherein a pinching and holding force is not required.

Therefore, it is necessary that the tensile strength of the belt be large and that the rigidity of the belt be high for use in the said conveyor apparatus. Because of this, the cost of the belt will be expensive and the required production time will be greatly increased.

Additionally, when the ends of the superposed belts are pressed and attached by the guide roller groups which are positioned in staggered arrangement, the belts which are superposed by the guide roller groups are curved in a zigzag state. The matter to be conveyed is pinched and held and it is necessary that the tensile force be applied to the longitudinal direction of the belt in order to positively pinch and hold the matter to be conveyed. On account of this, belt fabrication costs and time required for manufacturing will be increased.

When dropping the matter to be conveyed is prevented by tightening rollers from both sides of the superposed belts, the pressure within the superposed belts rises, and there is the possibility that the matter to be conveyed will leak and spurt from the end of the belt.

SUMMARY OF THE INVENTION

An object of the present invention is to provide a conveying method and a conveyor apparatus in which a tensile force in the direction of the width is applied to superposed belts and the matter to be conveyed is pinched and held by action of the said tensile force.

The conveying method of the present invention is characterized by the fact that two belts which are arranged oppositely are superposed and a tensile force in the direction of the width is applied to the superposed belts. A pinching and holding force for pinching and holding the matter to be conveyed by the superposed belts is generated and the matter to be conveyed is conveyed by transferring the said superposed belts to the longitudinal direction.

The conveyor apparatus of the present invention comprises two belts which are arranged oppositely and are superposed whereby inclined conveyance including vertical conveyance may be performed by pinching and holding the matter to be conveyed between the said belts. The conveyor apparatus is characterized by having means for applying a tensile force in the direction of the width to the superposed belts.

When the two belts which are arranged oppositely are superposed and the matter to be conveyed is pinched and held between the belts, it is possible that a pinching and holding force applied to the matter to be conveyed will be generated by providing a tensile force in the direction of the width of the belts.

When the matter to be conveyed is inserted between the superposed belts, the central portion of the belts will swell and project. A component force will be generated in opposite direction in order that the swell and the projection may be corrected in the belts by action of the tensile force which is applied to the belts, and the said component force will become a pinching and holding force against the matter to be conveyed.

In a conveyor apparatus wherein two belts are superposed and the matter to be conveyed is conveyed by pinching and holding the said matter between the belts, it is satisfactory that the tensile force against the belts be applied only to the section in which the matter to be conveyed is pinched and held by the belts. The tensile forces in the direction of the width of the belts are applied to the inclined conveying portion of the conveyor so as to practically pinch and hold the matter to be conveyed.

In the present invention, since the two belts which are arranged oppositely are superposed and the means for applying the tensile force in the direction of the width to the said superposed belts is arranged in the conveyor apparatus, the matter to be conveyed will be pinched and held by action of the tensile force.

When the said means for applying the tensile force comprises a pinching and holding roller which is arranged at an angle of inclination to the downstream side of the said superposed belts, tensile forces in the direction of the width of the belts will be applied to the superposed belts by the pinching and holding roller which is rotating with the transfer of the superposed belts.

As another example of the present invention when the said means for applying the tensile force comprises a pinching and holding roller to pinch and hold the superposed belts, a side roller in contact with the end face of the superposed belts and a lever to support and rotatably receive the said pinching and holding roller are provided. The side roller and the said lever are swingingly and movably mounted so that the tensile force is applied in the direction of the width of the belts by the pinching and holding roller which is rotating with a transfer of the superposed belts.

BRIEF DESCRIPTION OF THE DRAWING

FIG. 2 (A), FIG. 2 (B) and FIG. 2 (C) are enlarged, sectional views of the supporting rollers in the conveyor apparatus of FIG. 1 respectively.

FIG. 3 (A) and FIG. 3 (B) are enlarged views of the supporting rollers in the First Example of the present invention.

FIG. 4 (A) and FIG. 4 (B) are enlarged views of the supporting rollers in the Second Example of the present invention.

DESCRIPTION OF THE PREFERRED
EMBODIMENTS OF THE INVENTION

First Example

Figure 1:
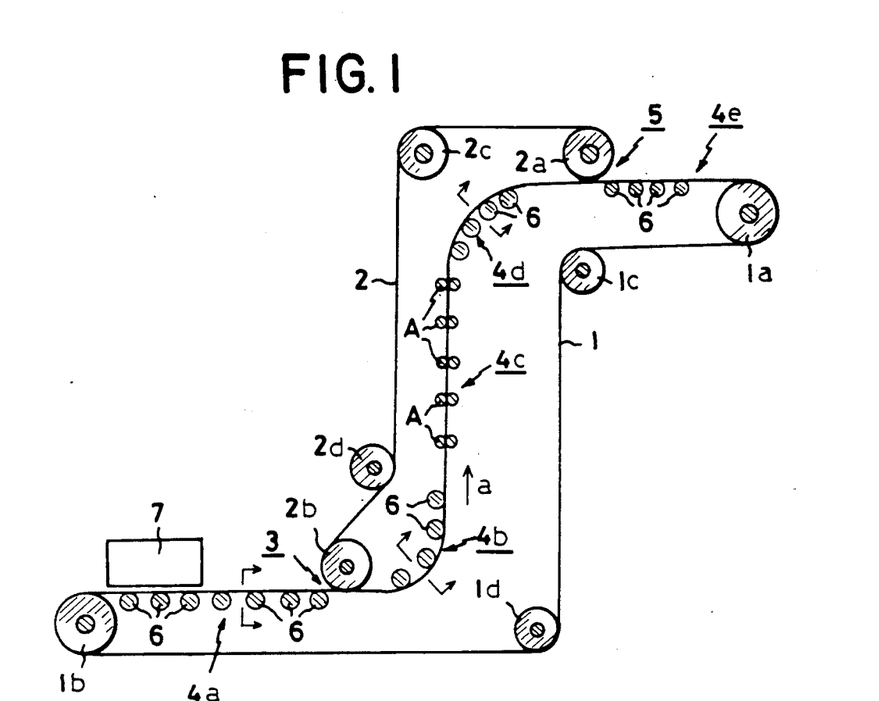
FIG. 1 is an explanatory drawing of the entire conveyor apparatus.

The conveyor apparatus as shown in FIG. 1 relates to a conveyor for performing vertical conveyance from a lower position to a higher position. The matters to be conveyed may be pulverulent bodies including coal dust, grain powder and the like, granular bodies including salt, sugar, sand and the like, massive bodies including coal, limestone and the like or fluids including muddy water and the like.

In the above-mentioned conveyor apparatus, the supporting belt 1 and the cover belt 2 comprise endless belts which are arranged oppositely in order to be able to be mutually superposed and an opening portion 3 for receiving the matter to be conveyed is formed at the contacting position of the belts 1 and 2. In order that the receiving of the matter to be conveyed may be performed smoothly, the opening portion 3 is formed by introducing the cover belt 2 in a wedge-shaped state into the supporting belt 1.

The supporting belt 1 is rolled and rotated about a driving roller 1a which is arranged at a higher position, a tail roller 1b which is arranged at a lower position and return rollers 1c and 1d. The said supporting belt is constructed so as to be able to convey and return by being driven in the direction of the arrow a. The cover belt 2 is rolled and rotated about a head roller 2a which is arranged at a higher position, a tail roller 2b which is arranged at a lower position and return rollers 2c and 2d. The said cover belt is moved together with the supporting belt 1 and is constructed so as to be able to return. In the present example, the cover belt 2 is constructed to be able to accompany the supporting belt and to move by contact friction with the supporting belt 1.

The conveyor apparatus comprises a first horizontal conveying portion 4a from the tail roller 1b which is arranged at a lower position of the supporting belt 1 to the first curved portion 4b. The first curved position 4b is formed as a continuation of the horizontal conveying portion 4a. An inclined conveying portion 4c for inclined conveyance, including vertical conveyance, continues from the first curved portion 4b. A second curved portion 4d continues from the inclined conveying portion 4c and a second horizontal conveying portion 4e continues from the second curved portion 4d.

The opening portion 3 is formed at the interconnection of the first curved portion 4b with the first horizontal conveying portion 4a. A releasing portion 5 is formed at the interconnection of the horizontal conveying portion 4e with the second curved portion 4d.

Figure 2A:
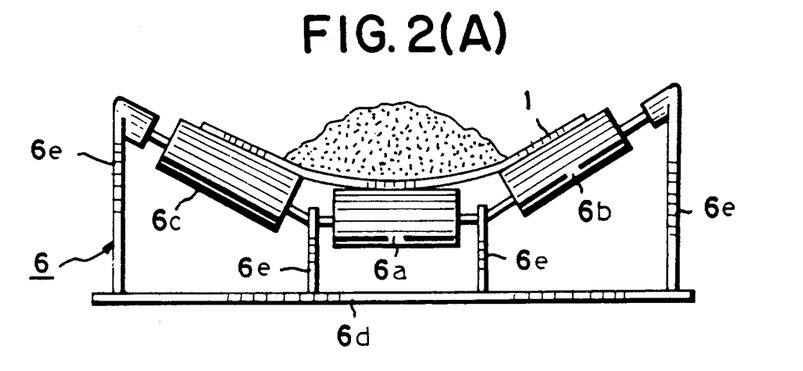

The first horizontal conveying portion 4a and the second horizontal conveying portion 4e convey the matter to be conveyed by the supporting belt 1 only as shown in FIG. 2(A). The supporting belt 1 and the cover belt 2 are superposed as shown in FIG. 2 (B) in the first curved portion 4b and as shown in FIG. 2 (C) in the second curved portion 4d, and the materials to be conveyed are conveyed by pinching and holding between the belts 1 and 2.

Figure 2B:
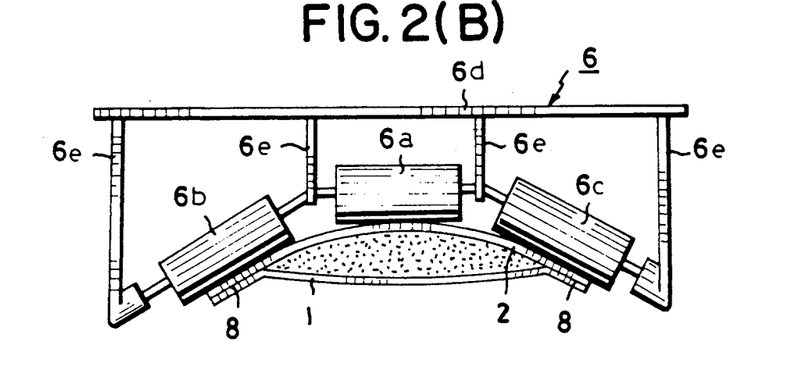
Figure 2C:
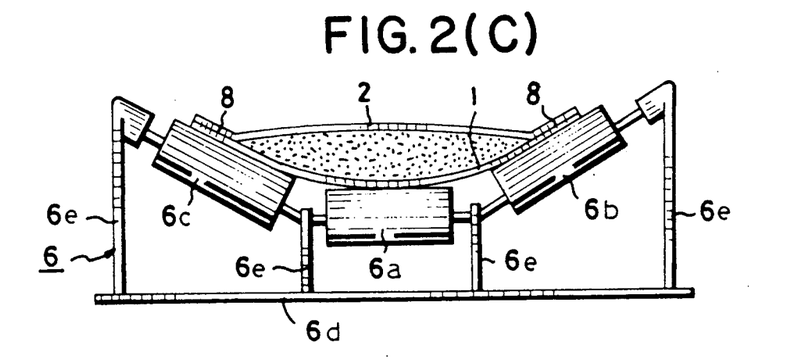

Plural supporting rollers 6a, 6b, 6c are constructed as shown in FIG. 2 (A), FIG. 2(B) and FIG. 2 (C) and are arranged in the first horizontal conveying portion 4a, the first curved portion 4b, the second curved portion 4d and the second horizontal conveying portion 4e.

As illustrated in FIG. 2 (A), the said belt 1 is formed with a concave curvature in order that the matter to be conveyed which is placed on the supporting belt 1 may be not dropped. The said supporting rollers 6 are employed as rollers for pinching and holding the matter to be conveyed by means of the supporting belt 1 and the cover belt 2 as shown in FIG. 2 (B) and FIG. 2 (C). The supporting roller 6 is segmented and comprises a roller 6a which is arranged horizontally and two rollers 6b and 6c which are arranged at a fixed inclined angle with regard to the roller 6a. The said respective rollers 6a, 6b, 6c are supported and received rotatably and movably in regard to the bracket 6e which is arranged at the frame 6d.

In the first and second horizontal conveying portions 4a and 4e and the second curved portion 4d as shown in FIG. 1, the said supporting rollers 6 are arranged at the lateral sides of the said supporting belt 1 as shown in FIG. 2 (A) and FIG. 2 (C) in order to support the load which is imposed on the supporting belt 1. Further, the supporting rollers 6 are arranged at the sides of the cover belt 2 as shown in FIG. 2 (B) in order to support the load which is imposed on the cover belt 2 in the first curved portion 4b.

A well-known type of hopper 7 is arranged at a fixed position on the upstream side of the opening portion 3 in the said horizontal conveying portion 4a.

The matter to be conveyed is supplied and delivered by a conveyor (not shown) or a bucket crane or the like into the said hopper 7.

The material to be conveyed which is received within the hopper 7 is supplied with a fixed quantity to the supporting belt 1 in accordance with the shape of the gate which is formed at the said hopper 7.

In the inclined conveying portion 4c, a plurality of pairs of rollers A are arranged in respectively opposing positions corresponding to the superposed portions 8 which are formed at both sides the supporting belt 1 and the cover belt 2.

Figure 3A:
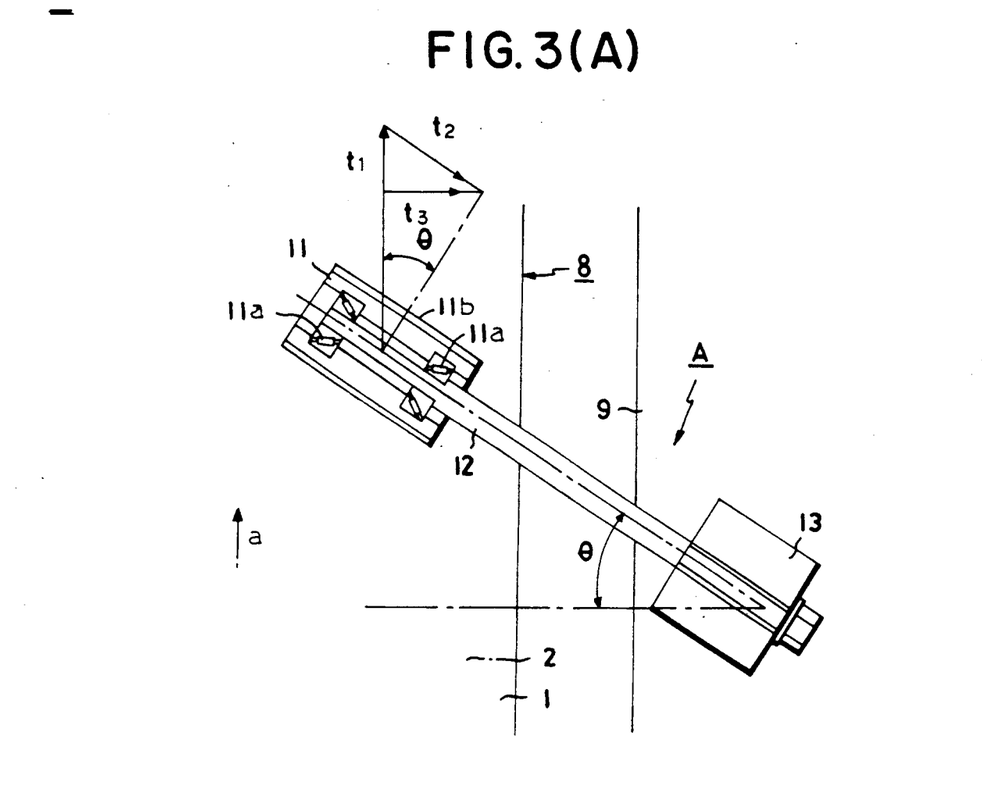
Figure 3B:
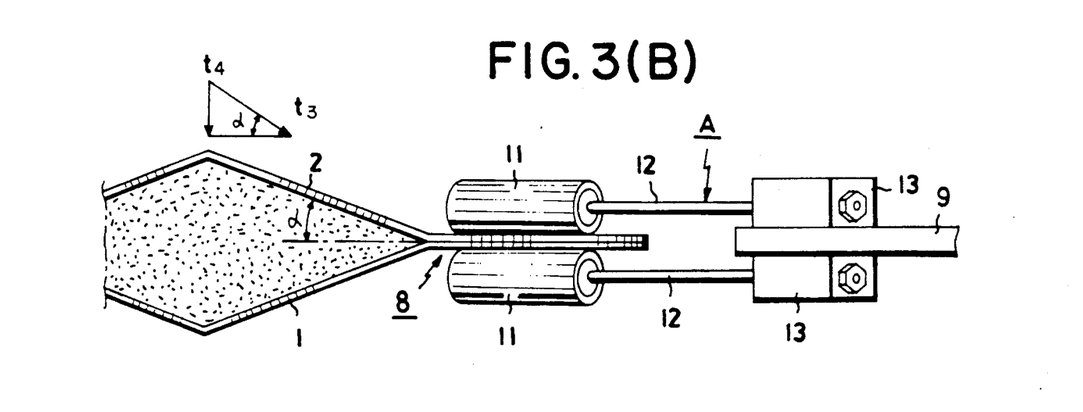

The pairs of rollers A are constructed as shown in FIG. 3 (A) and FIG. 3 (B) and are designed to and hold the said belts 1 and 2 between the pinching and holding rollers 11 of the roller pairs A. The lateral superposed portions of the supporting belt 1 and the cover belt 2 drive the roller pairs A so as to provide a tensile force in the direction of the width to the belts 1 and 2.

Still referring to FIG. 3, the roller pairs A each comprise pairs of pinching and holding rollers 11. The shaft 12 of each said roller 11 is supported and received rotatably within a block 13.

Each pinching and holding roller 11 is rotatable about its shaft 12 through bearings 11a. Since thrust is imposed in the direction of the shaft 12 upon rotation of the pinching and holding roller 11 within the bearing 11a, a tapered roller bearing which can receive a radial load and a thrust load simultaneously is used.

An operating space between the said pinching and holding rollers 11 is established according to the combined belts, the quality of the material and the like. It is preferable that the spacing between the shafts 12 be adjustable in well-known manner in the blocks 13.

It is possible that each of the said pinching and holding rollers 11 can be formed as a metallic roller, with rubber lining 11b applied on the surface of the said rollers 11 in order to enlarge contact friction with the surface of a belt. Also, it is possible that a cap made of rubber can be utilized in place of the rubber lining.

The said shaft 12 is inserted and secured in the block 13 which in turn is secured to the frame 9 of the conveyor apparatus. Each shaft 12 is installed with a fixed angle of inclination—to the axis of the direction of travel of the superposed belts 1 and 2. Therefore, the belts 1 and 2 will be pinched and held with an angle of inclination by the respective pairs of pinching and holding rollers 11.

Tensile forces in the direction of the width are applied to the belt by the roller pairs A which are constructed as mentioned above. The superposed portions 8 of the belts 1 and 2 are pinched and held by the pinching and holding roller pairs 11, and subsequently the belts 1 and 2 are transferred to the direction of the arrow a. The pinching and holding roller pairs 11 are rotated by the movement of the belts 1 and 2, and tensile forces in the direction of the width are applied to the superposed belts 1 and 2.

When the force which acts on the pinching and holding roller pairs 11 in the direction of the arrow a is considered as $t_1$ in keeping with the movement of the belts 1 and 2, the thrust $t_2$ operates along the shafts 12. As $t_2 = t_1 \sin \theta$, simultaneously, the tensile force $t_3$ operates as $t_3 = t_2 \cos \theta = t_1 \sin \theta \cos \theta$ in the direction of the width of the belts 1 and 2.

In this way, the tensile force $t_3$ which operates in the direction of the width of the belts 1 and 2 depends on a value of the angle of inclination $\theta$. Therefore, when the angle of inclination becomes larger, the tensile force $t_3$ becomes larger. When the angle of inclination becomes smaller, the tensile force $t_3$ becomes smaller.

When the superposed belts 1 and 2 pinch and hold the matter to be conveyed, the pinching and holding force which is considered as $t_4$ operates upon the matter to be conveyed by an action of the said tensile force $t_3$. That is to say, the central positions of the belts 1 and 2 swell and project when the matter to be conveyed is put between the belts 1 and 2. At this time, when the supporting belt 1 and the cover belt 2 have an inclination of angle therebetween caused by the said swelling and projection, the pinching and holding force $t_4$ operates as $t_4 = t_3 \sin \alpha$ upon the belts 1 and 2. Accordingly, the superposed belts 1 and 2 pinch and hold the matter to be conveyed by action of this pinching and holding force $t_4$.

Because of this, it is not necessary that a larger tensile force in the longitudinal direction be applied to the superposed belts 1 and 2. Accordingly, it is possible that the same type of belt as a belt which is normally employed in the usual conveyor apparatus having small tensile strength and rigidity can be used.

In the present example, the section in which the matter to be conveyed is pinched and held by superposing the supporting belt 1 and the cover belt 2 is the space from the first curved portion 4b to the second curved portion 4d through the inclined conveying portion 4c as shown in FIG. 1. Because of this, in the present example, by arranging the pairs of rollers A in the inclined conveying portion 4c, tensile force in the direction of the width is generated and applied to the superposed belts 1 and 2 in the inclined conveying portion 4c.

In the said conveyor apparatus, when the belts 1 and 2 do not pinch and hold the matter to be conveyed, the angle of inclination of the said belts 1 and 2 becomes zero degrees. At this time, when the superposed belts 1 and 2 are moved to the direction of the arrow a, the pinching and holding roller pairs 11 rotate with the movement and the tensile force $t_3$ will be generated in the direction of the width of the belts 1 and 2 by this rotation. The pinching and holding force $t_4$ is not generated in the said belts 1 and 2 because of the fact that the angle of inclination of the belts 1 and 2 is zero degrees.

When the matter to be conveyed is pinched and held between the belts 1 and 2, an angle of inclination $\alpha$ is generated by the fact that the central portion of the belts 1 and 2 swells and projects. When the belts 1 and 2 are moved in the direction of the arrow a, the pinching and holding roller pairs 11 rotate with the said movement and the tensile force $t_3$ is generated in the direction of the width of the belts 1 and 2. The pinching and holding force $t_4 = t_3 \sin \theta$ is generated in the belts 1 and 2 by the said tensile force $t_3$ and the matter to be conveyed is pinched and held by the said pinching and holding force $t_4$.

In this manner, when the said plurality of pairs of rollers A are arranged at the inclined conveying portion 4c and their rollers A are driven by the superposed belts 1 and 2, the output of the driving motor for driving the belts 1 and 2 increases. Since it is unnecessary that a larger tensile force is applied in the longitudinal direction of the superposed belts 1 and 2, the output of the driving motor decreases. An enlarging portion and a decreasing portion of output of the said driving motor will very nearly offset each other. In the present example, it is possible that the force required for driving the conveyor can be developed by the same size motor as a customary driving motor of a prior art conveyor system.

The loose materials to be conveyed are supplied to the hopper 7 by a conveyor, a bucket crane, or the like (not shown). The materials to be conveyed are supplied at a fixed quantity from the hopper 7 to the supporting belt 1 of the horizontal conveying portion 4a and then are then conveyed to the opening portion 3.

In the opening portion 3, the materials to be conveyed are inserted between the supporting belt 1 and the cover belt 2 and are then carried to the first curved conveying portion 4b, and to the inclined conveying portion 4c wherein the material is pinched and held by the belts 1 and 2.

The belts 1 and 2 are pinched and held by the plurality of pairs of rollers A which are arranged on each side in the inclined conveying portion 4c. Tensile force $t_3$ in the direction of the width of the belts is applied to the belts 1 and 2 and the pinching and holding force $t_4$ is applied to the belts 1 and 2 by the said tensile force $t_3$. The material to be conveyed is pinched and held by the said belts 1 and 2.

Successively, the materials to be conveyed are conveyed in the direction of the arrow a by being pinched and held by the belts 1 and 2 and are conveyed to the horizontal conveying portion 4e through the second curved conveying portion 4d for delivery to the next process.

Second Example

Figure 4A:
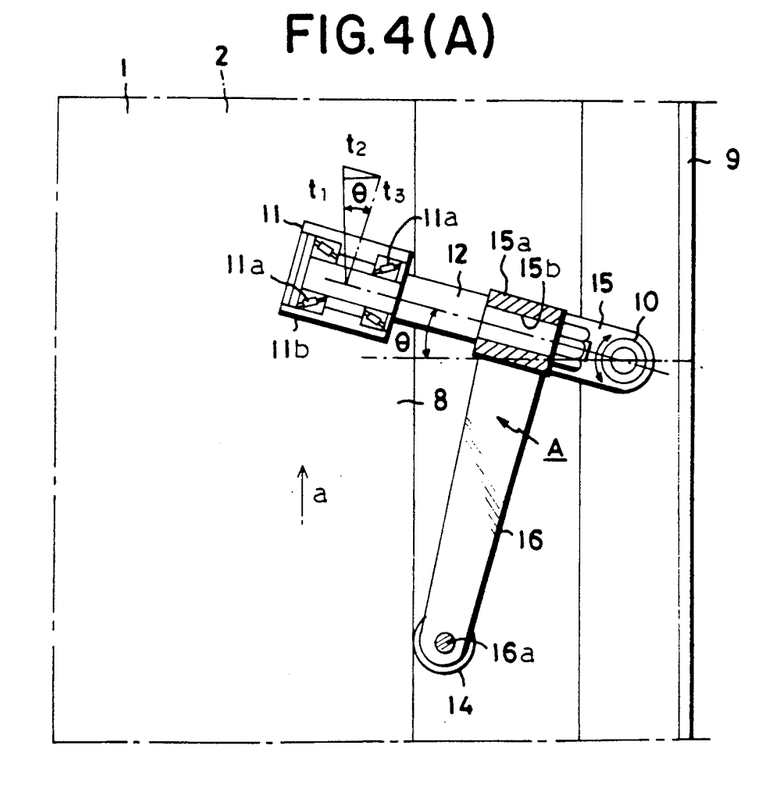
Figure 4B:
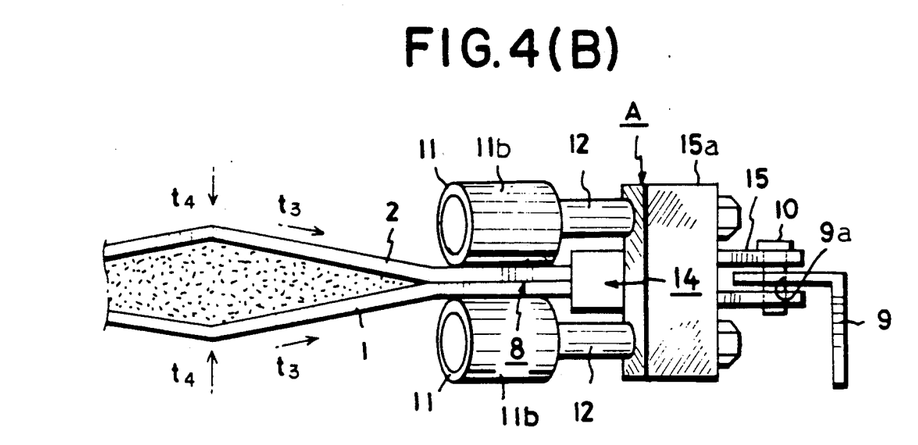

In FIG. 4 (A) and FIG. 4 (B), the roller A comprises the pinching and holding roller 11, the side roller 14 and a lever 15 for supporting and rotatably receiving the rollers 11 and 14. The roller A pinches and holds the superposed belts 1 and 2 and is in contact with an end face of the superposed portion 8 of the belts 1 and 2. The roller A swings and moves in the direction of the movement of the belts 1 and 2, and a tensile force $t_3$ in the direction of the width is applied to the said belts 1 and 2 by the roller A upon movement of the belts 1 and 2.

The said pinching and holding roller 11 pinches and holds the superposed portion 8 in the direction of the width of the supporting belt 1 and the cover belt 2 with regard to the direction of the thickness, and the said roller 11 rotates by being driven by the belts 1 and 2.

The aforementioned pinching and holding roller 11 is rotatably installed upon the shaft 12 which is inserted in the hole 15b of the bracket 15a formed on the lever 15. A suitable roller bearing 11a is employed for this purpose. The mutual interval between the pinching and holding rollers 11 can be readily adjusted in the bracket 15a in known manner.

The aforementioned side roller 14 is a roller designed to control the swinging and moving of the lever 15 by coming in contact with the end face of the superposed portion 8 of the superposed belts 1 and 2.

The side roller 14 is rotatably installed about the pin 16a which is arranged at lower tip of the arm 16 which secures to the bracket 15a through a suitable bearing (not shown). The aforementioned arm 16 is arranged further upstream in the direction of movement of the belts 1 and 2 than the bracket 15a. When the side roller 14 comes into contact with an end face of the superposed belt portion 8, the pinching and holding roller 11 defines an angle of inclination—to the normal to the direction of the movement of the superposed belts 1 and 2. Tensile force $t_3$ in the direction of the width of the belts is generated so as to be able to be applied to the belts 1 and 2 by the said pinching and holding roller pairs 11.

It is possible that the side roller 14 can be a metallic roller.

The aforementioned lever 15 is installed pivotally and movably in the direction of the movement of the superposed belts 1 and 2 in a hole 9a which is formed in the frame 9 of the conveyor apparatus by employing a pivot pin 10.

In the roller construction A, the length of the shaft 12 regulates the pinching and holding position on the superposed portion 8 of the belts 1 and 2 caused by the pinching and holding roller 11. The length of the arm 16 regulates the angle of inclination $\theta$ when the pinching and holding roller 11 pinches and holds the belts 1 and 2. The angle of inclination $\theta$ of the pinching and holding roller can be previously set by designing the length of the arm 16 to establish the tensile force $t_3$ which is given to the belts 1 and 2 by the pinching and holding roller 11. The length of the shaft 12 is so designed that the pinching and holding roller 11 may not be separated from the belts 1 and 2.

In order to apply tensile force $t_3$ in the direction of the width to the superposed belts 1 and 2, the superposed portion 8 of the belts 1 and 2 is pinched and held by the plurality of pinching and holding rollers 11 and the belts 1 and 2 are moved in the direction of the arrow a. The pinching and holding rollers 11 rotate upon movement of the belts 1 and 2. The pinching and holding rollers 11 are supported by the lever 15 and the lever 15 can swing and rotate about the pin 10 in either a clockwise or counter-clockwise direction. When the side roller 14 comes into contact with an end face of the superposed portion 8, the swing and movement of the lever 15 will stop and the pinching and holding roller pairs 11 will be maintained at the state in which the angle of inclination $\theta$ is defined. The pinching and holding rollers 11 rotate about the shaft 12 by being driven by the belts 1 and 2, and a tensile force $t_3$ in the direction of the width is imparted to the superposed belts 1 and 2 by the said pinching and holding rollers 11.

The aforementioned tensile force $t_3$ is generated by the same action as the operation which has been explained in connection with the above-mentioned example, the pinching and holding force $t_4$ for pinching and holding the matter to be conveyed is applied to the superposed belts 1 and 2 by this tensile force $t_3$, the same as in the previous example.

In the case where the roller A which is constructed as mentioned above is arranged oppositely on the both sides in the direction of the width of the superposed belts 1 and 2 in the inclined conveying portion 4c of the conveyor apparatus, and in the case where meandering is generated in the said belts 1 and 2 as well as the tensile force t₃ in the direction of the width can be given to the belts 1 and 2 as mentioned above, it is possible that the said meandering will be corrected.

Figure 5:
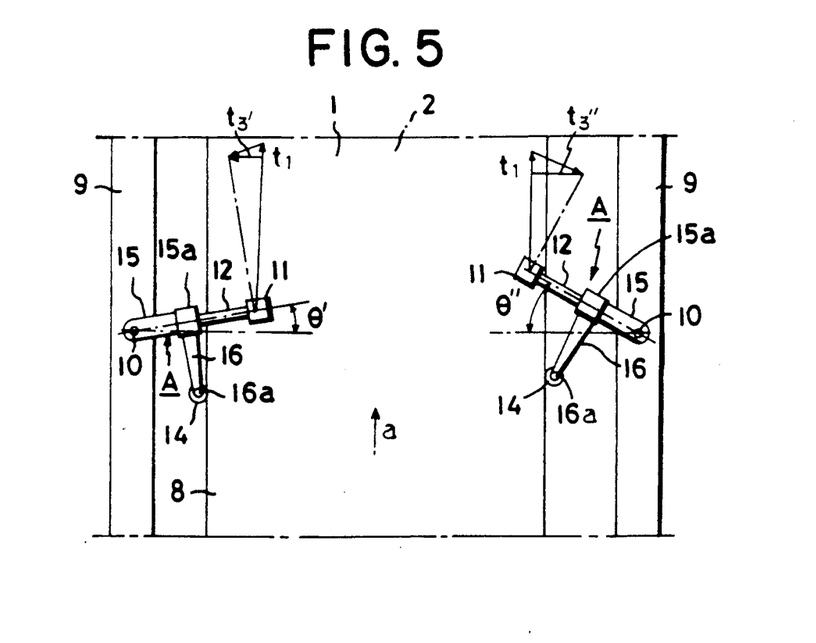
FIG. 5 is an enlarged partial plan view of the state in which a meandering of the belt is corrected by using the supporting roller in the Second Example of the present invention.

Each roller A is arranged with an angle of inclination $\theta$ on the both sides of the belts 1 and 2 by balancing the tensile force $t_3$ which is applied to the belts 1 and 2 at the state which meandering is not generated in the superposed belts 1 and 2, and the roller A maintains an established state of the first stage when the belts 1 and 2 are moved. As shown in the FIG. 5, the meandering is generated in the superposed belts 1 and 2, when the belts 1 and 2 are biased to one side. In such a case, the lever 15 swings and moves because of the fact that the side roller 14 will be moved by this bias, and an angle of inclination $\theta$ of the roller A will vary. In this variation, the angle of inclination $\theta'$ of the roller A of the side to which the belts 1 and 2 are biased (left side in the drawing) becomes smaller, and also the angle of inclination, $\theta''$ of the roller A of a side which the belts 1 and 2 are segregated (right side in the drawing) grows larger. Because of this, the tensile force $t_3$ which is applied to the belts 1 and 2 by the roller A becomes larger in the side segregated by the belts 1 and 2, and the meandering effect will be corrected by the fact that the original state tensile force will be returned.

In the case where the roller A is arranged at the inclined conveying portion 4c of the conveyor apparatus, in the case where the superposed belts 1 and 2 do not pinch and hold the material to be conveyed, the angle of inclination of the belts 1 and 2 will become zero degrees, and the pinching and holding roller 11 pinches and holds the superposed belts 1 and 2 by maintaining an angle of inclination $\theta$.

At this time, when the superposed belts 1 and 2 are moved in the direction of the arrow a, the pinching and holding rollers 11 rotate with the said movement, and the tensile force $t_3$ will be generated in the direction of the width of the belts 1 and 2 by this rotation. But, since the angle of inclination $\theta$ of the belts 1 and 2 is zero degrees, the pinching and holding force $t_4$ will not be generated in the belts 1 and 2.

When the matter to be conveyed is pinched and held between the belts 1 and 2, the width of the apparent belt becomes shorter by swelling and projecting of the central portion of the belts 1 and 2. Then an angle of inclination $\alpha$ occurs in the superposed belts 1 and 2 and the angle of inclination $\theta$ of the pinching and holding rollers 11 grows larger by the swing and movement of the lever 15. When the belts 1 and 2 are moved in the direction of the arrow a, the pinching and holding rollers 11 rotate with the said movement and the tensile force $t_3$ is generated in the direction of the width of the belts 1 and 2. The pinching and holding force $t_4 = t_3 \sin \alpha$ generated in the belts 1 and 2 by the tensile force $t_3$ and the material to be conveyed will be pinched and held by the same pinching and holding force $t_4$.

In this way, when the material to be conveyed is pinched and held between the belts 1 and 2, the angle of inclination $\theta$ of the pinching and holding rollers 11 varies in accordance with the swelling in the central portion of the belts 1 and 2. The pinching and holding force $t_4$, in answer to the tensile force $t_3$, is generated in the direction of the width of the belts 1 and 2 according to a value of the angle of inclination $\theta$. Also, the pinching and holding force $t_4$ varies according to the quantity of the material to be conveyed of which the superposed belts 1 and 2 pinch and hold.

Third Example

It is possible that rollers A which have been described and explained in the aforementioned examples can be used in place of the supporting rollers 6 in the first curved portion 4b and the second curved portion 4d, with the exception of the vertical conveying portion 4c of the conveyor apparatus.

According to the conveying method of the present invention as mentioned above in detail, since the two belts which are arranged oppositely are superposed and the tensile force in the direction of the width is applied to the belts, it is possible that the pinching and holding force to the material to be conveyed will be generated.

It is preferable that the pinching and holding force be generated in the only section in which the material to be conveyed is conveyed by being pinched and held between the superposed belts 1 and 2. Since the material to be conveyed is pinched and held by applying the tensile force in the direction of the width of the belt which exists in the section which is pinching and holding the material to be actually conveyed, then it is possible that the material to be conveyed can be conveyed by using the same substance as the conveyor belt which is used in the usual prior art conveyor apparatus.

Further, since the two belts which are arranged oppositely are superposed and the means for applying the tensile force in the direction of the width to the said superposed belts is arranged, the tensile force in the direction of the width is applied to the superposed belts, and it is possible that the material to be conveyed will be pinched and held by action of this tensile force. Because of this, it is possible to use a belt having small tensile strength and rigidity, and therefore it is possible to reduce the overall cost of the belt.

In the case where the means for applying the tensile force is generated by the pinching and holding rollers which are arranged with an angle of inclination to the direction of movement of the superposed belts, it is possible that the tensile force in the direction of the width is applied to the superposed belts by the pinching and holding rollers which are rotating with the movement of the superposed belts.

The aforementioned means for applying the tensile force comprises the pinching and holding rollers for pinching and holding the superposed belts, a side roller for contacting an end face of the superposed belts and a lever for supporting and rotatably receiving the pinching and holding roller and the side roller. The said means for applying the tensile force has the following characteristics: it is possible that the tensile force is applied in the direction of the width by the pinching and holding rollers which are rotating with the movement of the superposed belts wherein the lever is swingingly and movably movable to the direction of the movement of the superposed belts, and it is possible that meandering will be corrected in the case where this meandering is generated by the said superposed belts as the belts are moved.

What is claimed is:

1. A conveying method comprising superimposing portions of two oppositely arranged belts; applying tensile forces in the direction of the width to the said superposed belts; generating pinching and holding forces for pinching and holding the material to be conveyed by the superposed belts by utilizing the said tensile forces; depositing material to be conveyed upon one of the said belts; and moving the belts and pinching and holding the conveyed material between the superposed belts.

2. The method of claim 1 wherein the moving is in a horizontal direction.

3. The method of claim 1 wherein the moving is in an inclined direction.

4. The method of claim 2 wherein the moving is also in an inclined direction.

5. The method of claim 4 and the further step of transporting the material to be conveyed between portions of the said superimposed belts.

6. The method of claim 5 and the step of swelling and projecting portions of the superimposed belts with the material to be conveyed.

7. A conveyer apparatus including two superposed belts of preselected width and having lateral edges, which belts are arranged oppositely for the inclined conveyance including the vertical conveyance of the material to be conveyed by the said belts, the conveyor apparatus comprising a means for applying a tensile force to the said belts in the direction of the width of the said superposed belts, the tensile forces applied to the belts pinching and holding the conveyed material between the belts.

8. A conveyor apparatus including two superposed belts of preselected width, the belts having laterial edges and end faces, the belts being arranged oppositely for inclined conveyance including vertical conveyance of the material to be conveyed by the said belts, the conveyor apparatus comprising a means for applying a tensile force to the said belts in the direction of the width of the said superposed belts, the tensile forces applied to the belts pinching and holding the conveyed material between the belts, the means for applying the tensile force comprising a plurality of pairs of pinching and holding rollers, which rollers are arranged with an angle of inclination to the direction of travel of the said superposed belts, and a lever for supporting and rotatably receiving the said pinching and holding rollers and the side roller, the said lever being swingingly movable relative to the direction of travel of the superposed belts.

9. The conveyor apparatus of claim 8 wherein the pinching and holding rollers engage the lateral edges of the said superposed belts.

10. The conveyor apparatus of claim 8 wherein the superposed belts define a conveyor path comprising a first horizontal converging portion, a first curved portion extending from the first horizontal portion, an inclined conveying portion extending from the first curved portion, a second curved portion extending from the inclined conveying portion and a second horizontal portion extending from the second curved portion.

11. The conveyor apparatus of claim 10 wherein some of the said plurality of pairs of pinching and holding rollers are positioned in the said inclined conveying portion.

12. The conveyor apparatus of claim 11 wherein some of the said plurality of pairs of pinching and holding rollers are positioned in the first curved portion.

13. The conveyor apparatus of claim 12 wherein some of the said plurality of pairs of pinching and holding rollers are positioned in the second curved portion.

14. The conveyor apparatus of claim 13 wherein none of the plurality of pairs of pinching and holding rollers are positioned in the said first horizontal conveying portion.

* * * * *